(No Model.)
J. A. McCLELLAN.
STRAINER FOR COFFEE POTS, &c.
No. 558,512. Patented Apr. 21, 1896.
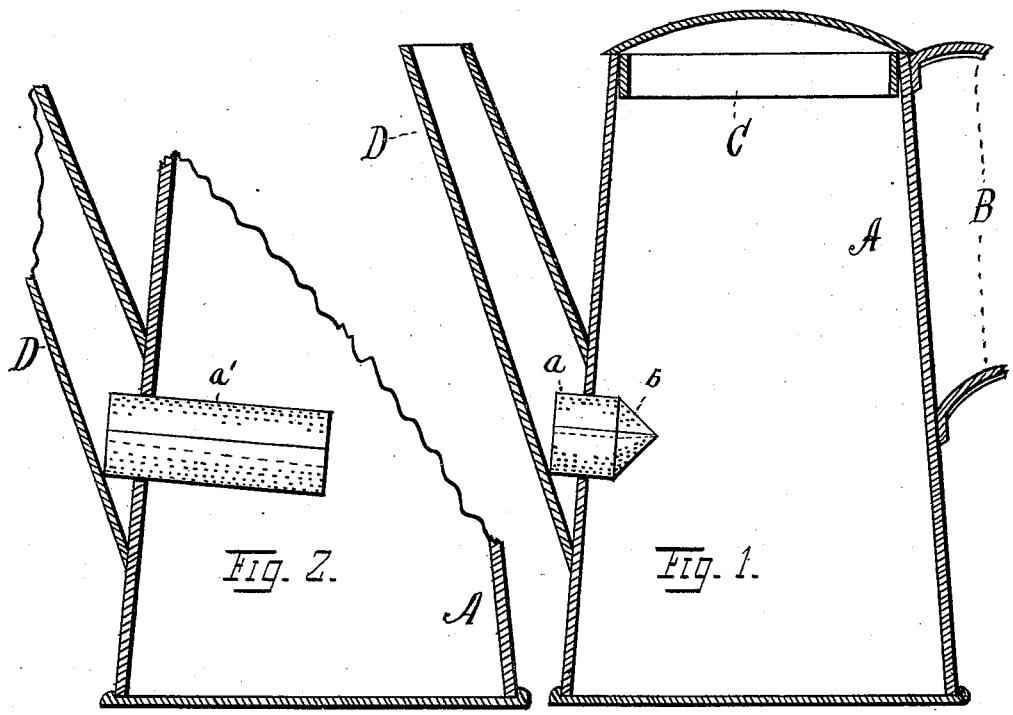
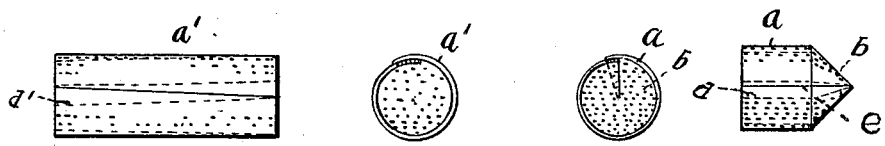
Witnesses: Inventor.

UNITED STATES PATENT OFFICE.

JOHN A. McCLELLAN, OF WALNUT SPRINGS, TEXAS.

STRAINER FOR COFFEE-POTS, &c.

SPECIFICATION forming part of Letters Patent No. 558,512, dated April 21, 1896.

Application filed November 10, 1894. Serial No. 528,454. (No model.)

*To all whom it may concern:*

Be it known that I, JOHN A. McCLELLAN, a citizen of the United States, residing at Walnut Springs, in the county of Bosque and State of Texas, have invented certain new and useful Improvements in Strainers for Coffee and Tea Pots; and I do hereby declare the following to be a full, clear, and exact description of the invention, such as will enable others skilled in the art to which it appertains to make and use the same.

This invention relates to an improvement in coffee and tea strainers, so constructed as to be attachable in the lower end of the spout or body of the pot, as shown; and the object of my improvement is to construct a strainer to be removable, durable, of minimum cost, and perfect in its operation.

Figure 1 is a sectional view of a coffee-pot provided with my improved strainer. Fig. 2 is a similar view with a portion of the pot and spout broken away and showing a modified form of the strainer shown in Fig. 1. Figs. 3 and 4 are side and end views of the strainer shown in Fig. 2. Figs. 5 and 6 are end and side views of the strainer shown in Fig. 1.

Referring to the drawings, A designates the pot, B designates the handle, C designates the lid, and D designates the spout, all constructed as in common use, and will be readily understood.

$a$ designates the strainer formed of perforated tin, as shown in Figs. 1, 5, and 6, having the seam or joint $e$, extending through the body and to the center of the conical-shaped end $b$ and allowing the seam a short lap when expanded, as shown in Fig. 6, and not secured by any solder, so that the strainer can be readily compressed to the dotted lines $d$, thus decreasing its diameter, when it can be readily inserted in the perforation leading to the spout D, when it is allowed to expand, and thus becomes fixed in the pot.

Instead of forming the strainer as just described it may also be formed, as shown in Figs. 2, 3, and 4, with its outer end soldered in, allowing the seam a short lap at its open end, as shown in Fig. 4, and in dotted lines in Fig. 3, and not secured by any solder.

When it is desired to secure the strainer in position, the open end of the body $a'$ is compressed to the dotted lines $d'$, when it is inserted in the perforation of the pot and allowed to expand and thus become fixed in the pot.

When it is desired to remove the strainer, all that is necessary is to compress it a little and it is easily removed.

Having thus described my invention, what I claim is—

1. A strainer, formed of perforated metal, and held in position by the spring of the metal of which it is formed substantially as described.

2. A strainer, formed of perforated metal, having the seam of the body extending to the conical end and not soldered, so that the body can be compressed and its diameter decreased, as and for the purpose described.

In testimony whereof I have affixed my signature in presence of two witnesses.

JOHN A. McCLELLAN.

Witnesses:
R. L. BAILEY,
W. T. HOWELL.